Oct. 2, 1962     S. J. LUCAS ETAL     3,056,633
TRACTION CHAIN AND WHEEL ASSEMBLIES
Filed Aug. 6, 1959     4 Sheets-Sheet 1
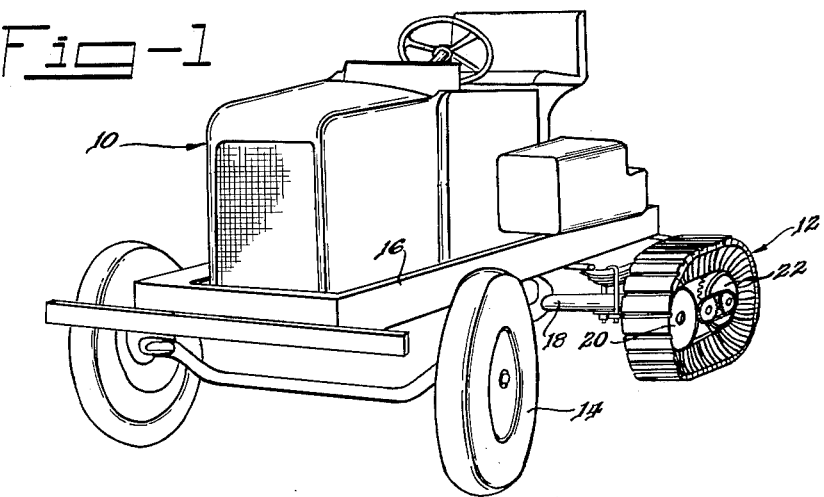
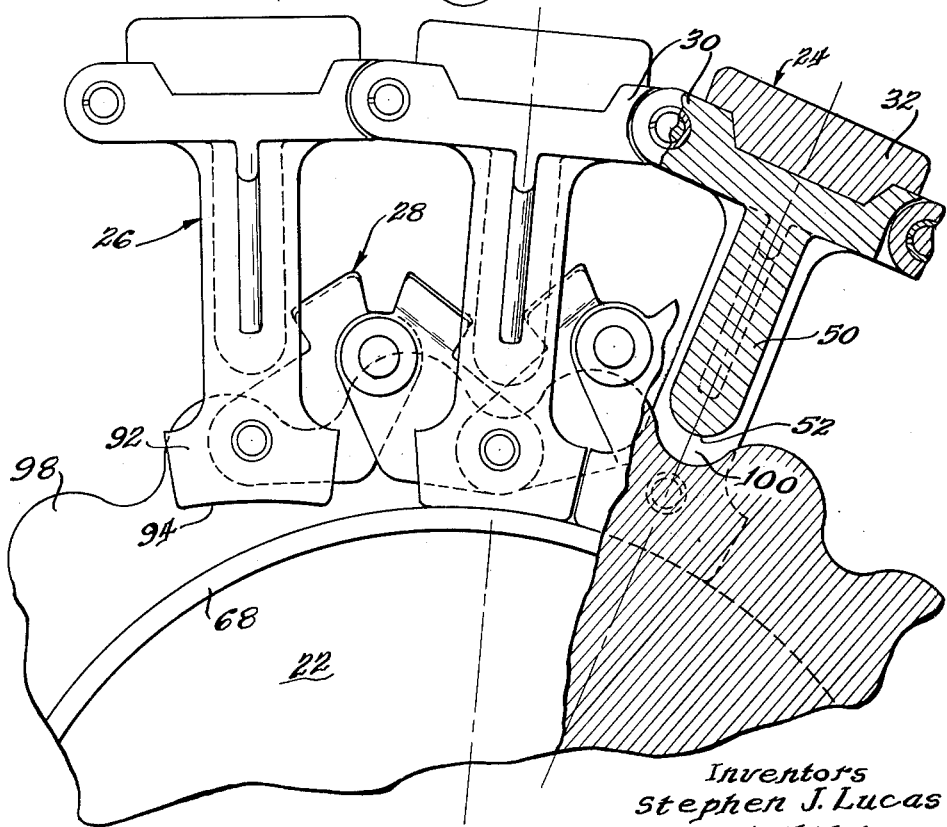
Inventors
Stephen J. Lucas
Alfred F. Tabron
By:
Graf, Nierman & Burmeister
Attorneys

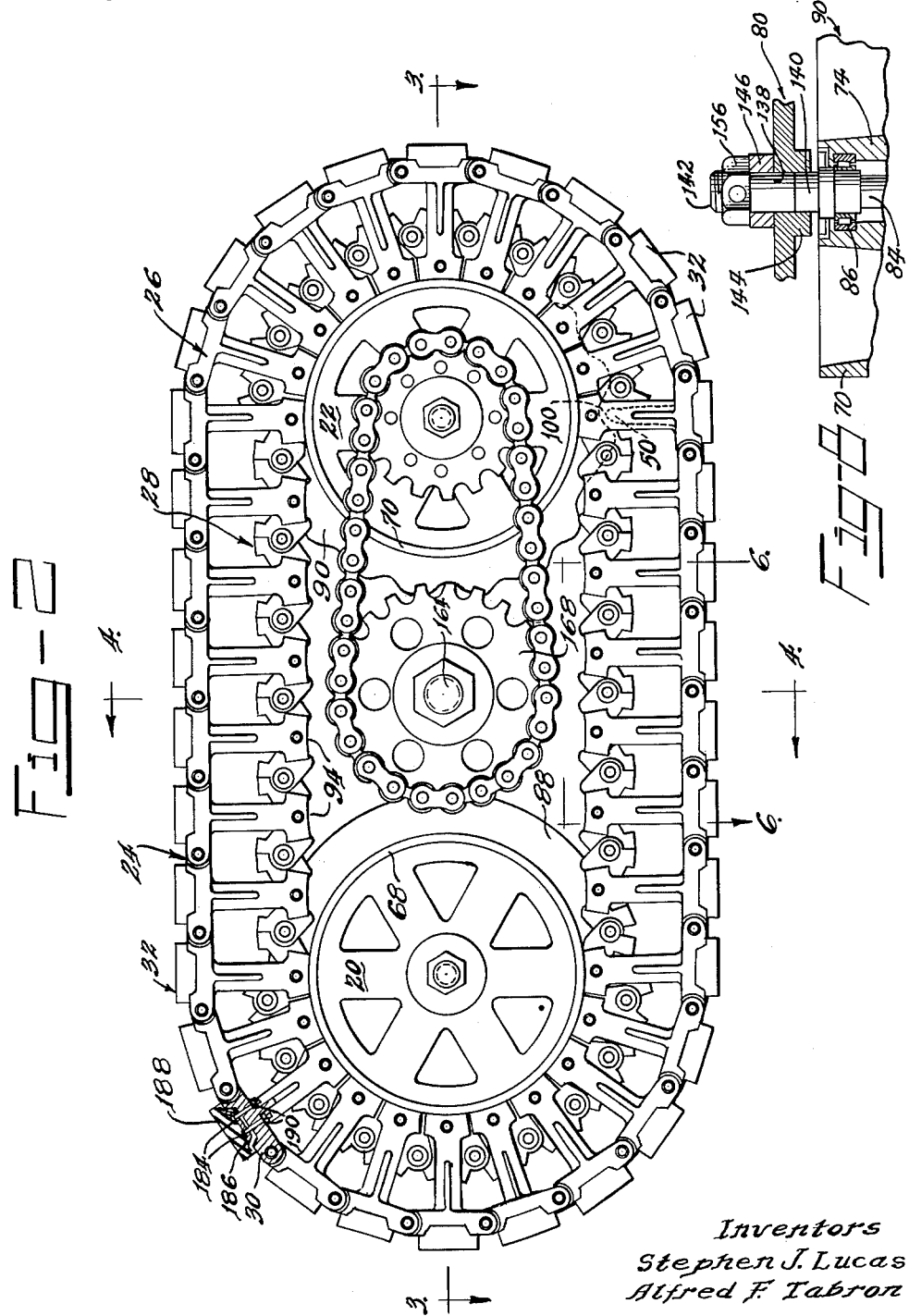

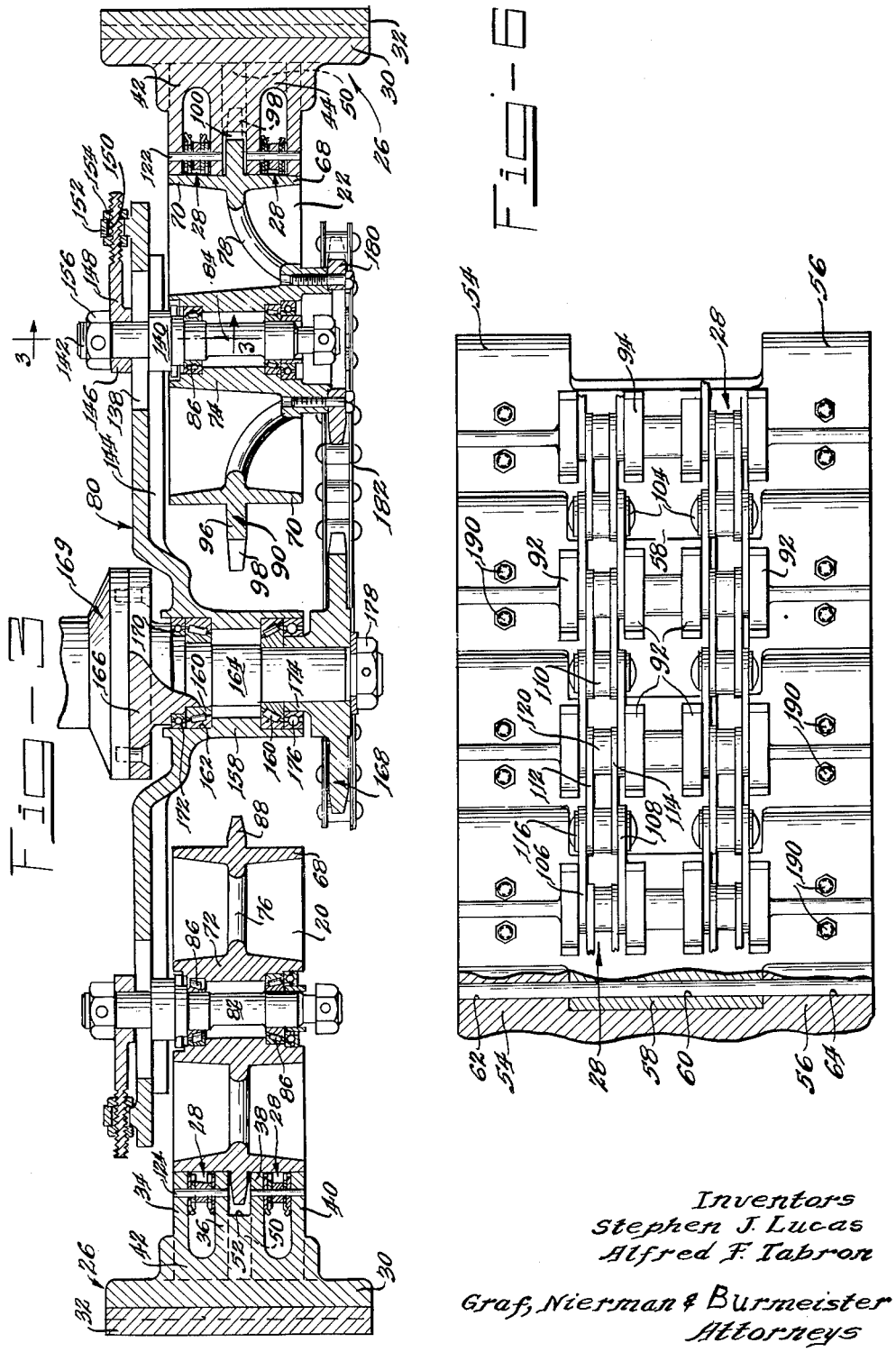

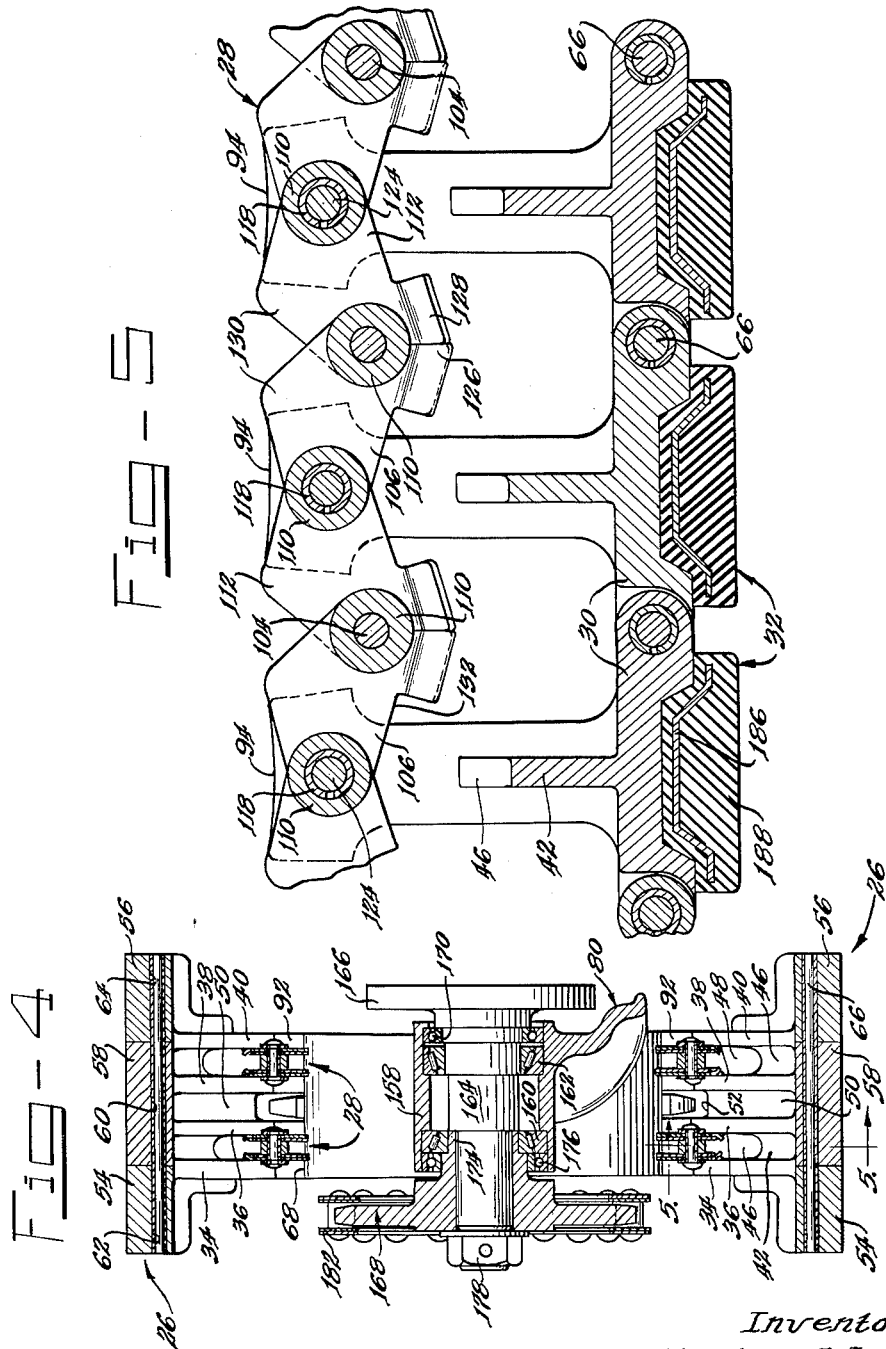

338,056,633
TRACTION CHAIN AND WHEEL ASSEMBLIES
Stephen J. Lucas, Chicago, and Alfred F. Tabron, Worth, Ill., assignors to Lok-Trak, Inc., Chicago, Ill., a corporation of Illinois
Filed Aug. 6, 1959, Ser. No. 832,037
10 Claims. (Cl. 305—49)

The present invention relates to wheel and chain assemblies for vehicles, conveyors, and the like; and to the combination of vehicles and such wheel and chain assemblies.

The present invention constitutes an improvement of the traction wheel and chain constructions covered by the patents of Clayton E. Frederickson, No. 1,687,834 and No. 2,383,184. Traction wheel and chain devices of the type disclosed in the Frederickson patents employ an endless chain of hinged traction shoes in combination with a chain which guides and controls the position of the shoes as they moved about two spaced wheels.

Heretofore such traction wheel and chain devices have experienced excessive wear with resulting breakage. The result has been that traction wheel and chain constructions of the type disclosed by the Frederickson patents have not been a commercial success. It is therefore an object of the present invention to provide a traction wheel and chain combination which operates with reduced wear and longer life.

Another reason for the lack of commercial success of the traction wheel and chain constructions disclosed by the Frederickson patents is the excessive cost in assembling the tracks and chains. It is therefore a further object of the present invention to provide a wheel and chain assembly which can readily be assembled with appreciably less labor and at a substantially reduced cost.

It is a further object of the present invention to provide a combined vehicle and wheel and chain traction assembly which will provide greater maneuverability and flexibility for the vehicle. Also, it is an object of the present invention to provide an improved means for mounting a traction wheel and chain assembly to a vehicle.

The novel features which are characteristic of the present invention are set forth with particularity in the appended claims. The invention itself both as to its organization and method of operation, together with additional objects and advantages thereof, will best be understood from the following description of a preferred embodiment thereof, when read in connection with the accompanying drawings, in which:

FIGURE 1 is an isometric view of a vehicle provided with a traction wheel and chain assembly constructed according to the teachings of the present invention;

FIGURE 2 is a front elevational view of the traction wheel and chain assembly illustrated in FIGURE 1;

FIGURE 3 is a sectional view taken along the line 3—3 of FIGURE 2;

FIGURE 4 is a sectional view taken along the line 4—4 of FIGURE 2;

FIGURE 5 is a sectional view taken along the line 5—5 of FIGURE 4;

FIGURE 6 is a sectional view taken along the line 6—6 of FIGURE 2;

FIGURE 7 is a fragmentary elevational view of a portion of the wheel and chain assembly illustrated in FIGURES 1 through 6; and FIGURE 8 is a sectional view taken along line 8—8 of FIGURE 3.

FIGURE 1 illustrates a vehicle 10 with wheel and traction chain assemblies 12 mounted thereon in place of rear wheels to propel the vehicle. As illustrated, the vehicle 10 has a frame 16 which supports front and rear axles 18. Power is applied to the rear axle; and the traction chain and wheel assemblies 12 are mounted on the ends of this axle. Even though it is to be understood that the wheel and traction chain assemblies constructed in accordance with the present invention have utilities in addition to that of propelling or supporting a vehicle, such as use as a conveyor, the wheel and traction chain assemblies have been shown in combination with the vehicle 10 because of the fact that they have particular advantages in this combination. As illustrated, the vehicle is provided with front wheels 14 for guiding the vehicle, although it is to be understood that wheel and chain assemblies could also perform this function.

FIGURES 1 through 4 illustrate an assembly 12 having two wheels 20 and 22 mounted in spaced relationship in a common plane, and an endless traction chain 24 mounted about the periphery of the wheels 20 and 22 and translatable with rotation of the wheels. The traction chain 24 is formed by a plurality of interlocked links or traction shoes 26 which are guided and controlled by a pair of hinged chains 28. The traction shoes 26 have a flat plate 30 which supports a pad 32 forming a traction surface. Each traction shoe 26 is provided with four spaced parallel integral posts 34, 36, 38 and 40 which extend normally from the plate 30 in a plane normal to the plane of the track. A supporting web 42 is disposed between the outer posts 34 and 36, and a similar web 44 is disposed between the outer posts 38 and 40, the webs 42 and 44 extending from the plate 30 approximately one-third the length of the posts, thus forming openings 46 and 48 between the posts 34, 36 and 38, 40, respectively, to accommodate the hinge chains 28. A tooth 50 for engaging the drive wheel 22 is disposed between the posts 36 and 38 and extends from the plate 30 to terminate in a part cylindrical surface 52 spaced from the ends of the posts 36 and 38 opposite the plate 30. Each of the plates 30 has two ears 54 and 56 extending outwardly from opposite ends of one side of the traction shoe, and a single ear 58 extending outwardly from the central portion of the other side of the plate 30. The single ear 58 of one traction shoe 26 is pivotally accommodated between the two ears 54 and 56 of the adjacent traction shoe. The ears 58 are provided with channels 60 which are aligned with channels 62 and 64 in the ears 54 and 56, respectively, to accommodate pins 66 therein. In this manner, the traction shoes 26 and pins 66 form a hinged traction chain.

The wheels 20 and 22 are provided with cylindrical rims 68 and 70, respectively, which are mounted on hubs 72 and 74 by webs 76 and 78, respectively. A mounting plate 80 supports two spindles 82 and 84 in spaced parallel relationship, and the hubs 72 and 74 are journaled about the spindles 82 and 84 on roller bearings 86.

Each of the rims 68 and 70 is provided with an outwardly extending guide ring 88 and 90, respectively, which extends from the center of the respective rim. The guide rings 88 and 90 are disposed between the posts 36 and 38 confronting the surface 52 of those traction shoes 26 which are engaged with the wheels 20 and 22.

The ends of each of the posts 34, 36, 38 and 40, designated 92, are identical in shape and protrude outwardly in the plane parallel to the plane of the track. Each of the ends 92 terminates in a surface 94 opposite the plate 30 which is curved on the same radius as the rims 68 and 70 of the wheels 20 and 22. Further, each of the pins 66 passing through the ears of a given traction shoe 26 are located at equal distance on opposite sides of the plane of the posts 34, 36, 38, and 40, and all portions of the posts are located between planes passing through the pins 66 of the given traction shoe and normal to the extension of the surface 94. As a result, the ends 92 of the posts abut the rims 68 and 70 and are accommodated thereabout when passing about the wheels 20 and 22.

The guide ring 88 of the wheel 20 extends from the rim 68 a distance less than the shortest distance from the surface 94 of the traction shoes 26 to the surface 52 thereof. As a result, the guide ring 88 merely maintains the traction chain 24 in alignment with the wheel 20. The guide rim 90 of the wheel 22, however, has two portions. The first portion 96 is a solid ring portion which extends from the rim 70 a distance less than the shortest distance from the surface 94 to the surface 52 of the traction shoes 26 so that it, like the guide ring 88, serves to maintain the traction shoes in alignment with the wheel 22. The guide ring 90, however, has a tooth portion 98 extending outwardly from the ring portion 96 to form a sprocket for the wheel 22. The tooth portion 98 extends a distance further than the shortest distance between the surface 94 and the surface 52 of the traction shoes 26, and the individual teeth of the portion 98 extend on opposite sides of the surface 52 of each of the traction shoes 26 disposed about the wheel 22. It is important to note that the ring portion 96 of the guide ring 90 does not engage the surface 52 of the tooth portion 50 of the traction shoes 26, except under extreme load conditions, but is spaced therefrom by a gap 100. During normal load conditions, torque is principally transmitted from the wheel 22 to the traction shoes 26 by frictional abutment of the surfaces 94 and the rim 70. This construction is best illustrated in FIGURES 2, 3 and 7.

The gap 100 between the surface 52 of the traction shoes 26 and the guide portion 96 of the guide rim 90 of the wheel 22 is sufficient to permit the traction shoes 26 to pass around the rim 70 without contact except for the surfaces 94 at the ends 92 of the posts, thus reducing wear and limiting contact between the traction shoes 26 and the wheel 22 in normal operation to the abutting surfaces 94 of the traction shoes 26 and the rim 70. FIGURE 2 illustrates the gap 100 for one traction shoe 26 located with its position the radius of the wheel 22 normal to the path of the approaching track, and also the position of the surface 52 relative to the sprocket for the adjacent traction shoe 26 approaching the wheel 22. FIGURE 7 illustrates the gap 100 of one traction shoe which has approximately 6 degrees to travel prior to the point of embarkation from the wheel 22 and the immediately preceding traction shoe which has now become aligned with the track. It is to be noted that there are eleven traction shoes 26 in abutment with each of the wheels 20 and 22 in the particular construction disclosed, and hence each of the traction shoes is separated by an arc of approximately 18 degrees about the wheels 20 and 22.

It is clear from FIGURES 2 and 7 that the sprocket or toothed portion 98 of the guide ring 90 does not in normal operation engage the teeth 50 of the traction chain 24. It is only when the traction chain 24 is jerked or encounters a bump that the sprocket engages the teeth 50 of the traction chain, and then after a revolution or two, the teeth 50 of the traction chain become realigned with the teeth of the sprocket to eliminate contact.

As stated above, the traction chain 24 is controlled and guided by two identical hinge chains 28 which are disposed between the legs 34, 36, and 38, 40 of the traction shoes 26, as best illustrated in FIGURES 2 through 6. Each chain 28 employs a plurality of pins 104 each of which journals two pair of links at opposite ends thereof, the outer links being designated 106 and 108. A hollow cylindrical spacer 110 is disposed between the links 106 and 108, and two additional or inner links 112 and 114 are disposed between each spacer 110 and the adjacent links 106 and 108, respectively. The ends of the pins 104 are swaged and a washer 116 is disposed between the ends of each pin and the links 106 and 108.

The links 106 and 108 journaled to each pin are also journaled about a hollow cylindrical sleeve 118 disposed on an axis spaced and parallel to the axis of the pin 104. Each of the sleeves 118 is provided with a hollow cylindrical spacer 110, and inner links 112 and 114 are journaled about the sleeve between the spacer 110 and the links 106 and 108 respectively. In other words, each of the outer links 106 and 108 is journaled about a sleeve 118 and a pin 104, and the inner links 112 and 114 journaled about that pin 104 are also journaled about a different sleeve 118.

Each of the posts 34, 36, 38 and 40 of the traction shoes 26 is provided with a bore 122, and the bores 122 are disposed on a common axis normal to the posts 34, 36, 38 and 40. A pin 124 extends through the bore 122 of the posts 34 and 36 of each traction shoe 26 and through one of the sleeves 118 of one of the chains 28. In like manner a pin 124 is disposed through each of the bores 122 in the posts 38 and 40 of each traction shoe 26 and through the intervening sleeve 118 of the chain 28 between the posts 38 and 40. The pins 124 are anchored to the posts 34, 36, 38 and 40, and the sleeves 118 are attached to the hinge chain 28. As a result of this construction, the chains 28 are completely fabricated independent of the traction shoes 26, and in assembling the traction chain and wheel assembly, it is only necessary to place the completed chains 28 between the posts 34, 36, 38 and 40 of the traction shoes 26 and place the pins 124 in position. It is not necessary to assemble the chains 28 into the traction shoes 26.

Each of the links 106 and 108 is provided with a stop lug on the side thereof adjacent one of the pins 104, the stop lugs being designated 126 and being bent inwardly relative to the axis of the chain 28. In like manner, each of the links 112 and 114 is provided with a stop lug 128 on the side thereof adjacent to one of the pins 104, and the stop lugs 128 are bent outwardly relative to the axis of the chain to abut the stop lugs 126 of the links 106 and 108. The stop lugs 126 and 128 are disposed on the side of the chains 28 confronting the traction shoes 26, and are arranged to abut each other to maintain the pins 104 outwardly from the pins 124 relative to the axis of the traction chain and wheel assembly. As a result of this construction, the track is permitted to bend around the wheels 20 and 22, but may not bend in the reverse direction beyond a straight line. Also, each of the links 106, 108, 112, and 114 is provided with a flat side 132 adjacent the lug thereof, and a protruding or projecting portion 130 on the side thereof opposite the flat side. Each projecting portion terminates in a surface forming an obtuse angle with the flat side 132, and the projecting portions 10 of the links abut the rims 68 and 70 of the wheels 20 and 22 to control opening and closing of the track in the manner set forth in the Frederickson Patent No. 2,383,184 referred to above.

The spindles 82 and 84 are adjustably mounted to the mounting plate 80 so that the distance between the spindles is adjustable over a range. Since each of the adjustable mounting means are identical, only one will be described. The spindle 82 or 84 extends through a slot 138 in the mounting plate 80. The slot 138 is parallel to the saraight portions of the track, and the slots for the two spindles 82 and 84 are aligned. Each of the spindles 82 and 84 has an outwardly extending flange 140 which abuts the side of the mounting plate confronting the traction chain 24 and wheels 20 and 22. Each spindle is also provided with a cylindrical shank 142 which extends through the slot 138. A pair of parallel outwardly extending walls 144 are disposed on each side of the slot 138 and spaced therefrom, and the flange 140 is provided with flat surfaces which engage the walls 144 to prevent the spindle from rotating. An eyelet 146 is disposed about the shank 142 of the spindle on the side of the mounting plate 80 opposite the traction chain 24 and the eyelet is provided with a threaded shaft 148 which extends parallel to the mounting plate 80 in the opposite direction from the other spindle. The shaft 148 extends through an opening 150 in a protruding anchor 152 disposed on the surface of the mounting plate opposite the traction chain 24, and the shaft is securely held in position by a pair of lock nuts 154 when the spindle is properly positioned. A lock nut 156 threadedly engaged to the shank 142 of the spindle is tightened upon the eyelet 146 and locked in place to secure the spindle in the proper position.

Approximately equidistant between the spindles 82 and 84 is a hub 158 which is integral with the mounting plate 80 and extends inwardly therefrom between the spindles. The hub 158 is provided with two roller bearing assemblies 160 mounted in indentations 162 at opposite ends of the hub 158. A drive shaft 164 is journaled within the roller bearing assemblies 160 and supports a mounting flange 166 at its end adjacent to the mounting plate 80 and a sprocket 168 at its opposite end. The flange 166 is designed to mate with the hub of a vehicle to which the traction chain and wheel assembly is mounted, here designated 169. The drive shaft 164 is provided with a shoulder 170 confronting the roller bearing assembly 160 contiguous to the flange 166, and a retaining ring 172 is disposed between the shoulder 170 and the roller bearing assembly 160. In like manner, the sprocket 168 is provided with an outwardly extending sleeve 174 which extends within the hub 158, and a retaining ring 176 is disposed between the hub 158 and the sleeve 174. The end of the drive shaft 164 opposite the mounting flange 166 engages the threads of a lock nut 178 which maintains the shoulder 170 in contact with the retaining ring 172 and also maintains the sleeve 174 of the sprocket 168 in abutment with the roller bearing assembly 160 in the recess 162.

The hub 74 of the wheel 22 is also provided with a sprocket 180 which is aligned with the sprocket 168. The sprockets 160 and 180 are interconnected by a link chain 182.

In a preferred construction of the traction chain and wheel assembly, the drive shaft 164 is disposed upon the center line midway between the spindles 82 and 84. The drive shaft 164 may be mounted directly to the hub of a conventional vehicle such as a truck, by the mounting flange 166 as a direct replacement for a wheel. Since there are no other connections between the vehicle and the traction chain and wheel assembly, it is possible to mount such an assembly on a vehicle in an extremely short time, even as a replacement for an existing wheel on a vehicle. Further, unless the body of the vehicle poses obstacles, the traction chain and wheel assembly is free to rotate completely about the drive shaft 164. As a result, the vehicle may be driven over ditches and the like which are wider than the height of the assembly as measured from the outer surfaces of the parallel portions of the traction chain, with the result that the track merely turns over on the axis of the drive shaft 164. This results in a chain track providing substantially greater maneuverability than chain tracks heretofore of a given size.

As indicated in FIGURE 2, the pads 32 are secured to the traction shoes 26 by bolts 184. These pads may be constructed of many different suitable materials, such as iron or rubber. FIGURE 2 illustrates a preferred construction for a rubber pad 30 in that it contains a plate 186 having the shape of the exterior surface of the plate 30 embedded in a layer 188 of rubber. The bolts 184 extend from the plate 186 through the plate 30 of the traction shoe 26, and are locked in position by nuts 190. A rubber shoe of this type may be readily employed for use on pavements since it will not mar the pavement, and the traction chain and wheel assembly will spread the load of the vehicle or other device over a wide area of the surface.

The traction shoes 26 may be constructed of any of the known construction materials having proper strength characteristics. Traction shoes have been constructed out of steel, aluminum and plastic.

Those skilled in the art will devise many additional embodiments and improvements upon tracks as a result of the teachings of the foregoing disclosure. It is therefore intended that the scope of the present invention be not limited by the foregoing disclosure, but rather only by the appended claims.

The invention claimed is:

1. A traction chain and wheel assembly comprising, in combination: first and second spaced wheels disposed for rotation in a common plane and having cylindrical rims coaxially disposed on each of the wheels and a guide ring extending outwardly from each rim in the plane of the wheels, an endless chain of traction shoes disposed about the wheels, each of said traction shoes having a plate with hinge ears on opposite sides thereof and the hinge ears of each plate being meshed with the hinge ears of the plates of adjacent shoes and coupled by pins extending through the meshed hinge ears, each traction shoe having a pair of spaced posts extending normally from the plate of the traction shoe and terminating on the end opposite the plate in a concave surface with a radius of curvature equal to the radius of the outer surface of the rims of the wheels, each traction shoe having a tooth extending between the posts thereof from the plate and terminating in a surface spaced from the ends of the posts by a distance greater than the distance the guide rings of the wheels extend from the rims of the wheels, the teeth of the traction shoes being disposed in the same plane as the guide rings of the wheels, each of the traction shoes being provided with two additional posts extending from the plate of the traction shoe parallel and in the same plane with the other two posts, said additional posts being on opposite sides of the other posts and spaced therefrom, an endless hinge chain disposed between each of the additional posts and the confronting other posts, each of said chains having a hinge joint journaled about a pin mounted between and normal to the additional post and confronting post of each traction shoe and a hinge joint located between successive traction shoes, and a plurality of spaced sprocket teeth extending radially outward from at least one of the guide rings, said teeth being disposed between the teeth of adjacent traction shoes engaging the wheel, wherein each hinge chain comprises a plurality of pins having a hollow cylindrical spacer thereabout, a first pair of links having parallel central planes and a first hole journaled about each pin between the spacer and one end of the pin and a second pair of links having parallel central planes and a first hole journaled about each pin between the spacer and the other end of the pin, each link of both pairs having a second hole spaced from the first hole and a protruding portion extending away from the plane of the axes of the first and second holes and terminating in straight intersecting surfaces at acute angles with said plane of the axes of the holes, the outer links of the first and second pair having a stop lug adjacent to the first hole and extending from the side opposite the protruding position thereof and extending to the central plane of the inner link of said pair, and the inner links of the first and second pair having a stop lug adjacent to the first hole extending from the side opposite the protruding portions thereof to the plane of the outer link of said pair, a hollow sleeve journaled within the second holes of the outer links of each first and second pair of links and the second holes of the inner links of an adjacent first and second pair of links, the pins coupling the chain to the posts of the traction shoes extending through the hollow sleeves.

2. A chain comprising a plurality of pins having a hollow cylindrical spacer thereabout, a first pair of links having parallel central planes, and a first hole journaled about each pin between the spacer and one end of the pin and a second pair of links having parallel central planes and a first hole journaled about each pin between the spacer and the other end of the pin, the links of both pairs having a second hole spaced from the first hole and a protruding portion extending away from the plane of the axes of the first and second holes and terminating in straight intersecting surfaces at acute angles with the plane of the axes of the holes, the outer links of the first and second pair having a stop lug adjacent to the first hole and extending from the side opposite the protruding position thereof to the plane of the inner link of said pair, and the inner links of the first and second pair having a stop lug adjacent to the first holes thereof extending from the side opposite the protruding portions thereof and terminating in the central plane of the outer link of said pair, and a shaft journaled within the second holes of the outer links of each first and second pair of links and the second holes of the inner links of an adjacent first and second pair of links.

3. A traction chain and wheel assembly comprising, in combination, first and second spaced wheels disposed for rotation in a common plane and having cylindrical rims coaxially disposed on each of the wheels and a guide ring extending outwardly from each rim in the plane of the wheels, an endless chain of traction shoes disposed about the wheels, each of said traction shoes having a plate with hinge ears on opposite sides thereof and the hinge ears of each plate being meshed with the hinge ears of the plates of adjacent shoes and coupled by pins extending through the meshed, hinge ears, each traction shoe having a pair of spaced posts extending normally from the plate of the traction shoe and terminating on the end opposite the plate in a concave surface with a radius of curvature equal to the radius of the outer surface of the rims of the wheels, each traction shoe having a tooth extending between the posts thereof from the plate and terminating in a surface spaced from the ends of the posts by a distance greater than the distance the guide rings of the wheels extend from the rims of the wheels, the teeth of the traction shoes being disposed in the same plane as the guide rings of the wheels, and a plurality of spaced sprocket teeth extending radially outward from at least one of the guide rings, said teeth being disposed between the teeth of the adjacent traction shoes engaging the wheel, in combination with a mounting plate having a pair of parallel spaced spindles extending from one side of the plate, the first wheel being journaled on one of the spindles and the second wheel being journaled on the other spindle, said mounting plate having a hub disposed between the spindles and a shaft journaled within the hub and extending from the side of the mounting plate opposite the spindles, whereby the shaft may be mounted to a vehicle.

4. A traction chain and wheel assembly comprising the elements of claim 3 wherein the mounting plate is provided with a slot disposed in the plane of the first and second spindles and a pair of walls extending outwardly from the surface of the mounting plate confronting the wheels, said walls being parallel to the plane of the spindles and adjacent to opposite sides of the slot, one of the spindles having a threaded cylindrical shank extending through the slot and a base abutting the walled surface of the mounting plate with flat surfaces on the opposite sides thereof confronting the walls, an eyelet disposed about the shank of the spindle having a threaded shaft, said threaded shaft of the eyelet extending from the shank of the spindle on the side thereof opposite the other spindle, said shaft extending through an anchor extending from the mounting plate, a lock nut disposed on the shaft abutting the anchor and a second lock nut disposed on the shank of the spindle abutting the eyelet.

5. A vehicle comprising a frame, a front and a rear axle extending therefrom, and a traction chain and wheel assembly mounted on each end of at least one of the axles, said traction chain and wheel assembly including the elements of claim 4.

6. A traction chain and wheel assembly comprising the elements of claim 3 in combination with means coupled to the shaft and the wheel having teeth extending from the guide ring thereof for transmitting rotational power from the shaft to said wheel.

7. A vehicle comprising, in combination, a frame, a front and a rear axle extending therefrom, at least one of said axles being driven to propel the vehicle, a mounting hub disposed on each end of the driven axle, and a traction chain and wheel assembly comprising the elements of claim 6, mounted on each mounting hub, the shaft of each traction chain and wheel assembly being mounted on the mounting hubs of the vehicle.

8. A traction chain and wheel assembly comprising the elements of claim 3 wherein the hub is disposed equidistant from the spindles on the axis of the spindles.

9. A traction chain and wheel assembly comprising the elements of claim 3 in combination with a first sprocket mounted to the shaft and a second sprocket mounted coaxially to the wheel having teeth extending from the guide ring thereof, said first and second sprockets being in a common plane, and an endless chain meshed with the first and second sprockets.

10. A traction chain and wheel assembly comprising first and second spaced wheels disposed for rotation in a common plane and having cylindrical rims coaxially disposed on each of the wheels and a guide ring extending outwardly from each rim in the plane of the wheels, an endless chain of traction shoes disposed about the wheels, each of said traction shoes having a plate with hinge ears on opposite sides thereof and the hinge ears of each plate being meshed with the hinge ears of the plates of adjacent shoes and coupled by pins extending through the meshed hinge ears, each traction shoe having a pair of spaced posts extending normally from the plate of the traction shoe and terminating on the end opposite the plate in a concave surface with a radius of curvature equal to the radius of the outer surface of the rims of the wheels, each traction shoe having a tooth extending between the posts thereof from the plate and terminating in, a surface spaced from the ends of the posts by a distance greater than the distance the guide rings of the wheels extend from the rims of the wheels, the teeth of the traction shoes being disposed in the same plane as the guide rings of the wheels, and a plurality of spaced sprocket teeth extending radially outward from at least one of the guide rings, said teeth being disposed between the teeth of the adjacent traction shoes engaging the wheel and spaced from the teeth of the traction shoes in combination with a pad having a body and a plurality of anchoring pins extending from one side of the body, said pins extending through apertures in the plate of one of the traction shoes and securing the body of the pad against the surface of the plate opposite the posts of the traction shoe.

References Cited in the file of this patent

UNITED STATES PATENTS

| | | |
|---|---|---|
| 1,687,834 | Frederickson | Oct. 16, 1928 |
| 1,812,875 | Henneuse | July 7, 1931 |
| 2,332,313 | Galanot | Oct. 19, 1943 |
| 2,383,184 | Frederickson | Aug. 21, 1945 |
| 2,385,923 | Klaucke et al. | Oct. 2, 1945 |